(12) United States Patent
Koyanagi

(10) Patent No.: US 11,973,413 B2
(45) Date of Patent: Apr. 30, 2024

(54) POWER CONVERSION DEVICE

(71) Applicant: Mitsubishi Electric Corporation, Tokyo (JP)

(72) Inventor: Kimiyuki Koyanagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 229 days.

(21) Appl. No.: 17/770,659

(22) PCT Filed: Dec. 13, 2019

(86) PCT No.: PCT/JP2019/048880
§ 371 (c)(1),
(2) Date: Apr. 21, 2022

(87) PCT Pub. No.: WO2021/117213
PCT Pub. Date: Jun. 17, 2021

(65) Prior Publication Data
US 2022/0385164 A1 Dec. 1, 2022

(51) Int. Cl.
*H02M 1/00* (2006.01)
*H02M 3/156* (2006.01)

(52) U.S. Cl.
CPC .......... *H02M 1/007* (2021.05); *H02M 3/156* (2013.01)

(58) Field of Classification Search
CPC .............................. H02M 1/007; H02M 3/156
See application file for complete search history.

(56) References Cited

U.S. PATENT DOCUMENTS

| | | | | |
|---|---|---|---|---|
| 2008/0310195 | A1* | 12/2008 | Seberger | H02M 3/158 363/26 |
| 2010/0265744 | A1 | 10/2010 | Dorn et al. | |
| 2011/0175441 | A1* | 7/2011 | Langlois | H02M 3/158 307/9.1 |
| 2013/0194840 | A1* | 8/2013 | Huselstein | H02M 1/32 363/50 |
| 2015/0188447 | A1* | 7/2015 | Jimichi | H02M 7/483 363/65 |

(Continued)

FOREIGN PATENT DOCUMENTS

| | | |
|---|---|---|
| GB | 2533212 A | 6/2016 |
| JP | 2004-289955 A | 10/2004 |
| JP | 2011-503852 A | 1/2011 |

OTHER PUBLICATIONS

Extended European search report dated Nov. 8, 2022, in corresponding European patent Application No. 19955445.2, 9 pages.

(Continued)

*Primary Examiner* — Rafael O De Leon Domenech
(74) *Attorney, Agent, or Firm* — XSENSUS LLP

(57) ABSTRACT

The power conversion device includes: a series unit composed of two switching elements; and a plurality of DC capacitors each connected in parallel to the series unit. The two switching elements and the plurality of DC capacitors are disposed in this order such that positive terminals and negative terminals thereof are aligned on a same side. Among busbars making connection between the respective DC capacitors and the switching elements, a busbar other than the busbar connected to the DC capacitor disposed at a farthest position has an inductance adjustment portion providing a bypass.

9 Claims, 22 Drawing Sheets

(56) References Cited

U.S. PATENT DOCUMENTS

2019/0028021 A1* 1/2019 Chivite-Zabalza ..... H02J 7/345
2021/0013816 A1* 1/2021 Davidson ............ H02M 7/5388

OTHER PUBLICATIONS

International Search Report and Written Opinion dated Mar. 3, 2020, received for PCT Application PCT/JP2019/048880, Filed on Dec. 13, 2019, 8 pages including English Translation.
Office Action issued Feb. 1, 2024 in European Patent Application No. 19 955 445.2, 5 pages.

* cited by examiner

POWER CONVERSION DEVICE

CROSS-REFERENCE TO RELATED APPLICATION

The present application is based on PCT filing PCT/JP2019/048880, filed Dec. 13, 2019, the entire contents of which is incorporated herein by reference.

TECHNICAL FIELD

The present disclosure relates to a power conversion device.

BACKGROUND ART

A modular multilevel converter (MMC) is of a circuit type in which output terminals of cell converters each composed of a DC capacitor and a switching element capable of being controlled to be turned on/off such as an IGBT are connected in series so that a high voltage higher than a withstanding voltage of the switching element can be outputted. The MMC is expected to be applied to DC power transmission systems (HVDCs), reactive power compensation devices (STATCOMs), and the like. According to Patent Document 1, an MMC is formed by connecting a plurality of cell converters in series (cascade). Each cell converter is composed of: a main circuit composed of a switching element and a DC capacitor; and an external terminal for cascade connection to another one of the cell converters. An external conductor is used for bridge connection between the switching elements.

Meanwhile, increase of a rated current of the cell converter requires both increase of a rated current of the switching element and increase of a capacitance of the DC capacitor. The easiest way to increase the capacitance of the DC capacitor is to increase the number of DC capacitors that are in parallel (see, for example, Patent Document 2).

CITATION LIST

Patent Document

Patent Document 1: Japanese Laid-open Patent Publication (translation of PCT application) No. 2011-503852
Patent Document 2: Japanese Laid-Open Patent Publication No. 2004-289955

SUMMARY OF THE INVENTION

Problems to be Solved by the Invention

In Patent Document 2, DC capacitors that are used in parallel are mounted at the same distance from a switching element. Thus, wiring inductances on busbars connecting the switching element and the respective DC capacitors are basically equal to one another between the switching element and each DC capacitor. Therefore, the magnitudes of currents flowing from the switching element to the respective DC capacitors are also basically equal to one another. However, the configuration in Patent Document 2 has the following drawback. That is, if DC capacitors are additionally provided from the state in FIG. 3 to the state in FIG. 7 in Patent Document 2, the width of a cell converter is increased in an arrangement configuration of a power conversion device intended for HVDCs. Considering this, the number of the cell converters that can be accommodated in a cell converter accommodation frame has to be decreased, or the horizontal dimension of the cell converter accommodation frame has to be increased.

The present disclosure has been made to solve the above drawback, and an object of the present disclosure is to obtain a power conversion device in which: the magnitudes of currents flowing to respective DC capacitors are set to be equal to one another; and the width of a cell converter does not increase even if the number of the DC capacitors that are used in parallel is increased.

Solution to the Problems

A power conversion device according to the present disclosure includes: a first switching element and a second switching element each having a positive terminal and a negative terminal; and a plurality of DC capacitors each having a positive terminal and a negative terminal. The negative terminal of the first switching element and the positive terminal of the second switching element are connected to each other. Each of the plurality of DC capacitors is connected in parallel between the positive terminal of the first switching element and the negative terminal of the second switching element. The first switching element, the second switching element, and the plurality of DC capacitors are disposed in this order or the second switching element, the first switching element, and the plurality of DC capacitors are disposed in this order, such that all of the positive terminals and the negative terminals are aligned on a same side. A plurality of positive-side busbars are provided, the number of the positive-side busbars being equal to the number of the DC capacitors, each positive-side busbar connecting the positive terminal of the first switching element and the positive terminal of a corresponding one of the plurality of DC capacitors to each other. A plurality of negative-side busbars are provided, the number of the negative-side busbars being equal to the number of the DC capacitors, each negative-side busbar connecting the negative terminal of the second switching element and the negative terminal of a corresponding one of the plurality of DC capacitors to each other. An adjustment positive-side busbar which is a positive-side busbar among the plurality of positive-side busbars other than the positive-side busbar connected to the DC capacitor farthest from the first switching element, has an inductance adjustment portion providing a bypass such that a length on the adjustment positive-side busbar between the positive terminal of the first switching element and the positive terminal of the DC capacitor to which the adjustment positive-side busbar is connected, is longer than a straight distance between the positive terminal of the first switching element and the positive terminal of the DC capacitor to which the adjustment positive-side busbar is connected. An adjustment negative-side busbar which is a negative-side busbar among the plurality of negative-side busbars other than the negative-side busbar connected to the DC capacitor farthest from the second switching element, has an inductance adjustment portion providing a bypass such that a length on the adjustment negative-side busbar between the negative terminal of the second switching element and the negative terminal of the DC capacitor to which the adjustment negative-side busbar is connected, is longer than a straight distance between the negative terminal of the second switching element and the negative terminal of the DC capacitor to which the adjustment negative-side busbar is connected.

Effect of the Invention

The power conversion device according to the present disclosure leads to obtainment of a power conversion device in which: the magnitudes of currents flowing to respective DC capacitors are set to be equal to one another; and the width of a cell converter does not increase even if the number of the DC capacitors that are used in parallel is increased.

DESCRIPTION OF EMBODIMENTS

Embodiment 1

Figure 1:
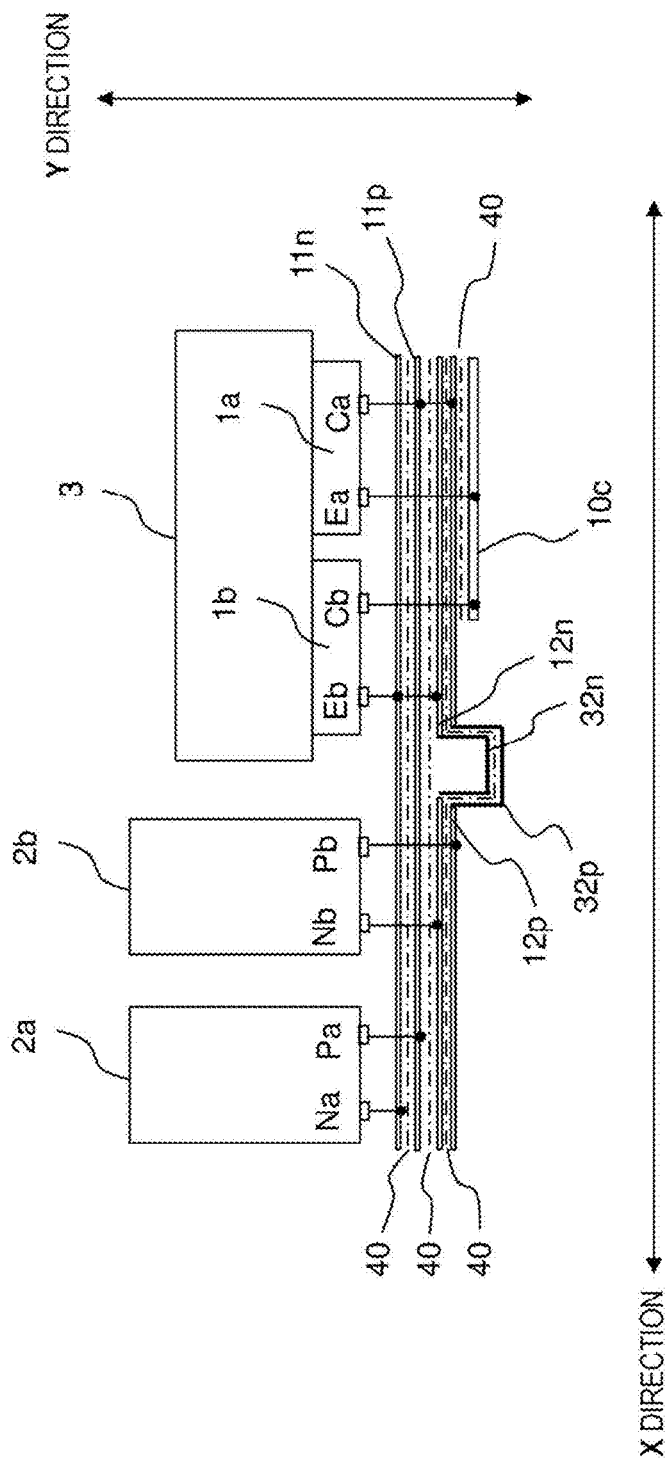
FIG. 1 is a first schematic diagram showing a configuration of a power conversion device according to embodiment 1.
Figure 2:
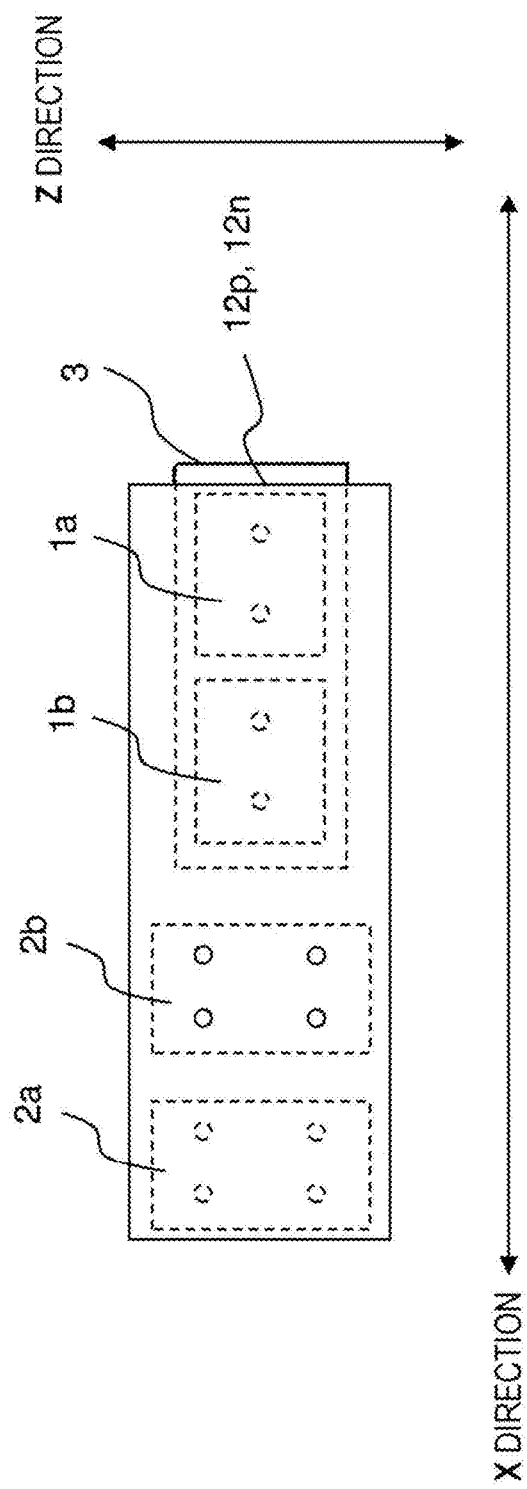
FIG. 2 is a second schematic diagram showing the configuration of the power conversion device according to embodiment 1.
Figure 3:
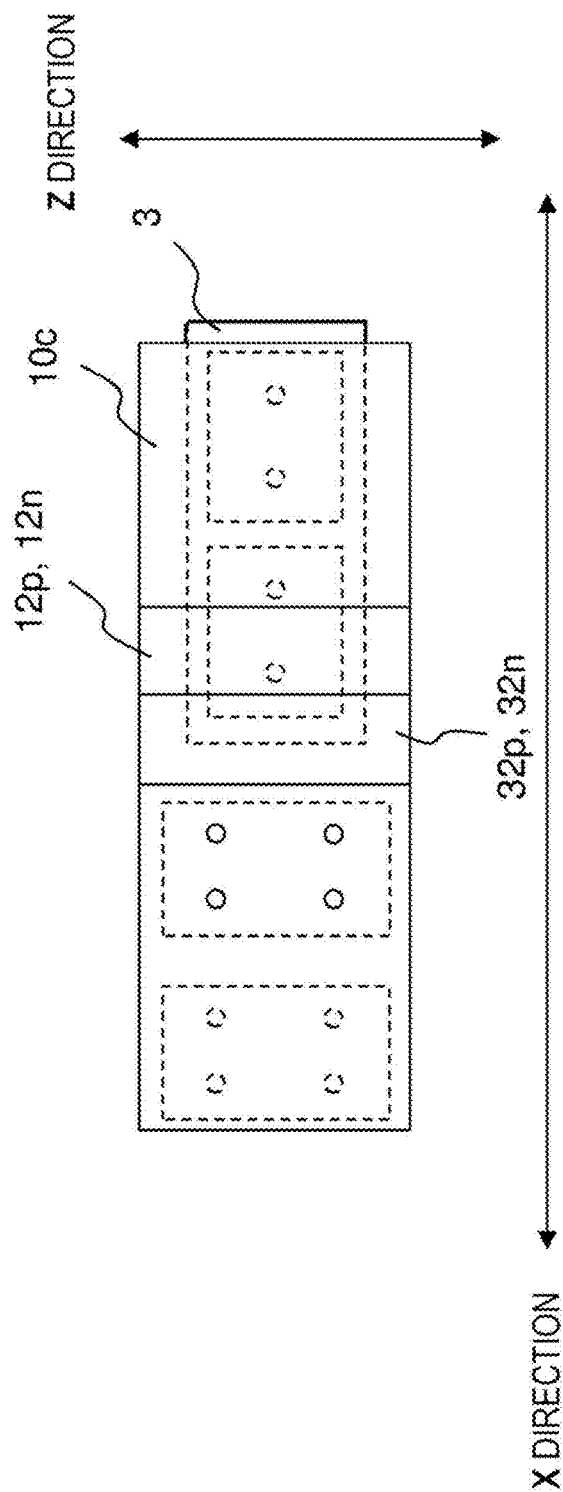
FIG. 3 is a third schematic diagram showing the configuration of the power conversion device according to embodiment 1.
Figure 4:
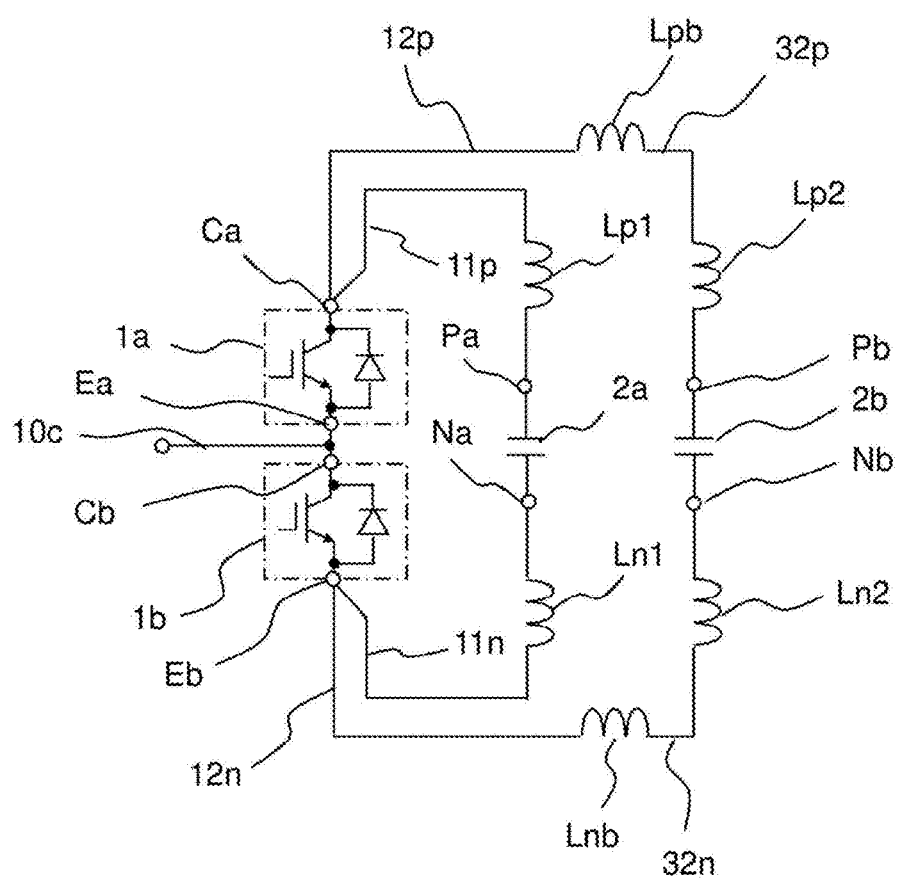
FIG. 4 is a circuit diagram showing an equivalent circuit of the power conversion device according to embodiment 1.

FIG. 1 to FIG. 3 are schematic diagrams showing a component configuration of a power conversion device according to embodiment 1. FIG. 1 is a top view, and FIG. 2 and FIG. 3 are side views. FIG. 2 is a side view in which some busbars are excluded from busbars shown in the top view in FIG. 1. FIG. 4 is a circuit diagram showing an equivalent circuit of the power conversion device shown in FIG. 1 to FIG. 3. That is, FIG. 1 to FIG. 3 are schematic diagrams in which components on the circuit shown in FIG. 4 are disposed. The power conversion device according to embodiment 1 is a power conversion device including: a first switching element $1a$ in which a first switch and a first diode connected in antiparallel to the first switch are mounted; a second switching element $1b$ in which a second switch and a second diode connected in antiparallel to the second switch are mounted; a first DC capacitor $2a$; a second DC capacitor $2b$; and a cooler 3 which is mounted with the first switching element $1a$ and the second switching element $1b$ and which cools the switching elements. The first switching element $1a$ and the second switching element $1b$ are mounted on a flat surface portion of the cooler 3 by means of fixation members such as screws so as to be parallel to the shape of the cooler 3 in an X direction. Here, the first switching element $1a$, the second switching element $1b$, the first DC capacitor $2a$, and the second DC capacitor $2b$ have respective positive terminals and respective negative terminals, and are disposed to be aligned in the X direction such that all of the positive terminals and the negative terminals are on a same side. The first switching element $1a$ and the second switching element $1b$ are disposed to be adjacent to each other, and the first DC capacitor $2a$ and the second DC capacitor $2b$ are disposed to be adjacent to each other. The DC capacitor disposed farther from the switching elements is defined as the first DC capacitor $2a$.

These electrical components are electrically connected to each other by busbars in order to form the circuit in FIG. 4.

A midpoint busbar 10*c* makes bridge connection between a negative terminal Ea of the first switching element 1*a* and a positive terminal Cb of the second switching element 1*b*. A positive terminal Ca of the first switching element 1*a* and a positive terminal Pa of the first DC capacitor 2*a* are electrically connected to each other by a first positive-side busbar 11*p*, and the positive terminal Ca of the first switching element 1*a* and a positive terminal Pb of the second DC capacitor 2*b* are electrically connected to each other by a second positive-side busbar 12*p*. A negative terminal Eb of the second switching element 1*b* and a negative terminal Na of the first DC capacitor 2*a* are electrically connected to each other by a first negative-side busbar 11*n*, and the negative terminal Eb of the second switching element 1*b* and a negative terminal Nb of the second DC capacitor 2*b* are electrically connected to each other by a second negative-side busbar 12*n*.

Here, the second positive-side busbar 12*p* has an inductance adjustment portion 32*p* providing a bypass such that a length on the second positive-side busbar 12*p* between the positive terminal Ca of the first switching element 1*a* and the positive terminal Pb of the second DC capacitor 2*b* is longer than a straight distance between the positive terminal Ca of the first switching element 1*a* and the positive terminal Pb of the second DC capacitor 2*b*. The second positive-side busbar 12*p* having the inductance adjustment portion 32*p* is sometimes referred to also as an adjustment positive-side busbar 12*p*. Further, the second negative-side busbar 12*n* has an inductance adjustment portion 32*n* providing a bypass such that a length on the second negative-side busbar 12*n* between the negative terminal Eb of the second switching element 1*b* and the negative terminal Nb of the second DC capacitor 2*b* is longer than a straight distance between the negative terminal Eb of the second switching element 1*b* and the negative terminal Nb of the second DC capacitor 2*b*. The second negative-side busbar 12*n* having the inductance adjustment portion 32*n* is sometimes referred to also as an adjustment negative-side busbar 12*n*.

Each busbar is formed of, for example, a sheet-shaped metal. The positive-side busbar and the negative-side busbar which are connected to each DC capacitor, are disposed in a superposed manner such that sheet surfaces of the busbars face each other with an insulating member 40 (indicated by an alternate long and short dash line) being interposed therebetween. Specifically, the first positive-side busbar 11*p* and the first negative-side busbar 11*n* are disposed in a superposed manner with an insulating member 40 being interposed therebetween, and the second positive-side busbar 12*p* and the second negative-side busbar 12*n* are disposed in a superposed manner with an insulating member 40 being interposed therebetween. Further, the set of two busbars connected to the first DC capacitor 2*a* and the set of two busbars connected to the second DC capacitor 2*b* may be disposed in a superposed manner with an insulating member 40 being interposed between the sets. Although, in FIG. 1, the first negative-side busbar 11*n* is disposed closer to the switching elements and the DC capacitors than the first positive-side busbar 11*p* is, the positions of these busbars may be reversed. Likewise, although the second negative-side busbar 12*n* is disposed closer to the switching elements and the DC capacitors than the second positive-side busbar 12*p* is, the positions of these busbars may be reversed.

Figure 5A:
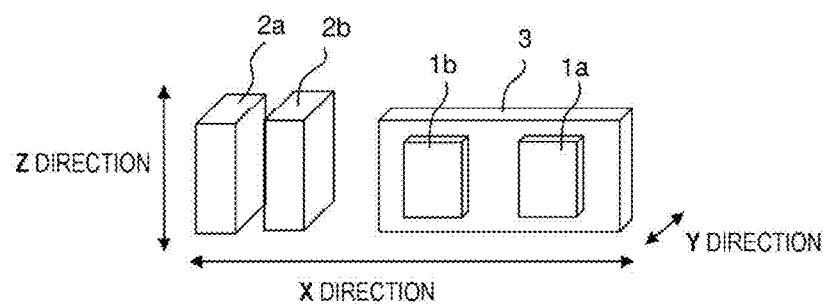
FIG. 5A is a first diagram for explaining a busbar connection state in the power conversion device according to embodiment 1.
Figure 5B:
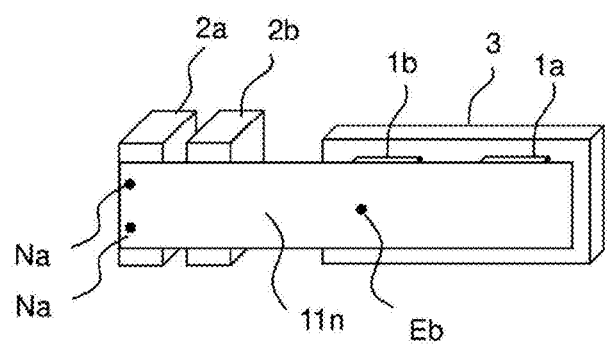
FIG. 5B is a second diagram for explaining the busbar connection state in the power conversion device according to embodiment 1.
Figure 5C:
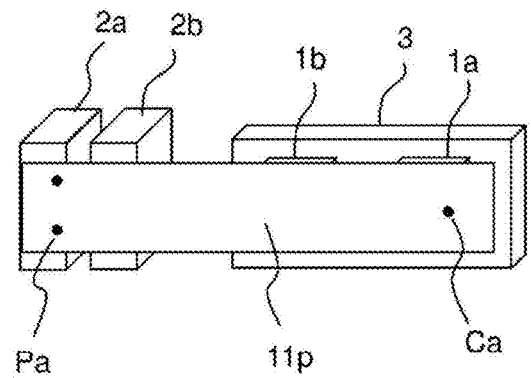
FIG. 5C is a third diagram for explaining the busbar connection state in the power conversion device according to embodiment 1.
Figure 5D:
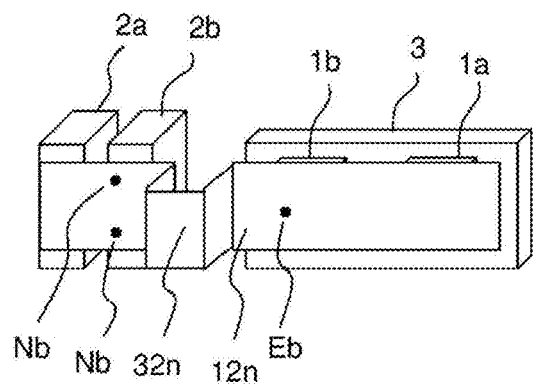
FIG. 5D is a fourth diagram for explaining the busbar connection state in the power conversion device according to embodiment 1.
Figure 5E:
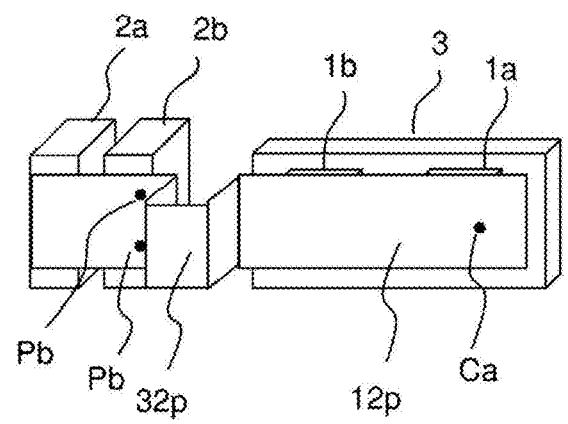
FIG. 5E is a fifth diagram for explaining the busbar connection state in the power conversion device according to embodiment 1.
Figure 5F:
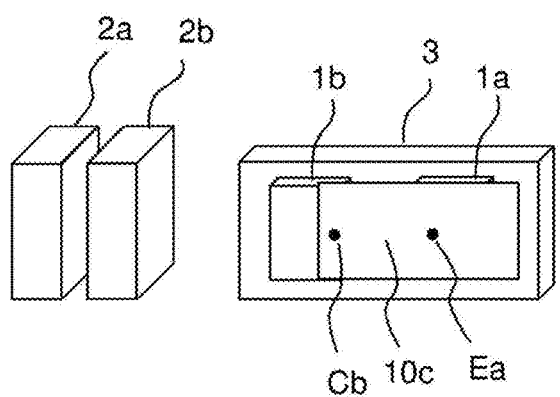
FIG. 5F is a sixth diagram for explaining the busbar connection state in the power conversion device according to embodiment 1.

FIG. 5A to FIG. 5F are perspective views showing the states of the busbars in an easily understandable manner. FIG. 5A shows a state where no busbar is present. FIG. 5B shows a state where the negative terminal Eb of the second switching element 1*b* and the negative terminal Na of the first DC capacitor 2*a* are connected to each other by the first negative-side busbar 11*n*. FIG. 5C shows a state where the positive terminal Ca of the first switching element 1*a* and the positive terminal Pa of the first DC capacitor 2*a* are connected to each other by the first positive-side busbar 11*p*. FIG. 5D shows a state where the negative terminal Eb of the second switching element 1*b* and the negative terminal Nb of the second DC capacitor 2*b* are connected to each other by the second negative-side busbar 12*n* having the inductance adjustment portion 32*n*. FIG. 5E shows a state where the positive terminal Ca of the first switching element 1*a* and the positive terminal Pb of the second DC capacitor 2*b* are connected to each other by the second positive-side busbar 12*p* having the inductance adjustment portion 32*p*. FIG. 5F shows a state where the negative terminal Ea of the first switching element 1*a* and the positive terminal Cb of the second switching element 1*b* are connected to each other by the midpoint busbar 10*c*.

Figure 6:
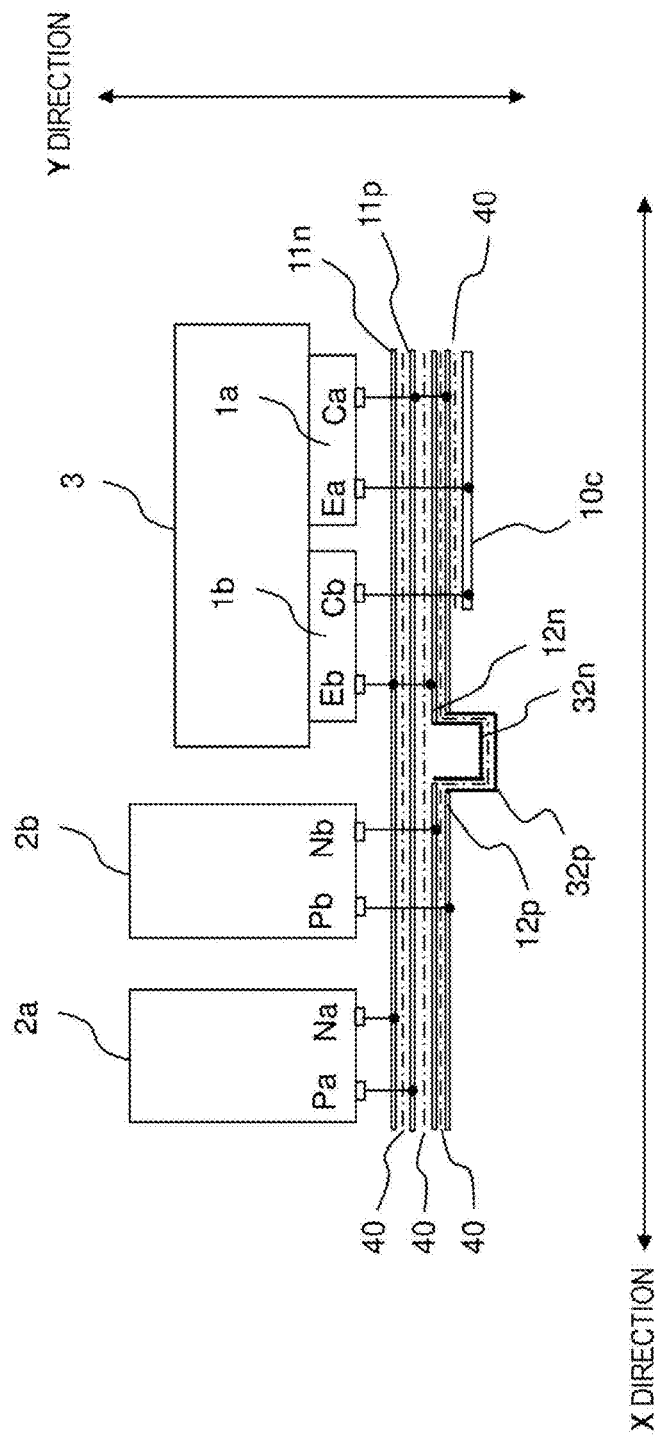
FIG. 6 is a schematic diagram showing another configuration of the power conversion device according to embodiment 1.

FIG. 6 is a schematic diagram showing another component configuration of the power conversion device according to embodiment 1. The sequences of the positive terminals and the negative terminals of the DC capacitors are not limited to the sequences in FIG. 1, and the positive terminals may be located farther from the switching elements as shown in FIG. 6. That is, either of the positive terminals and the negative terminals may be located farther from the switching elements. However, the sequence of the positive terminal and the negative terminal is preferably the same between the DC capacitors. Specifically, the sequence of the positive terminal and the negative terminal is preferably the same between the first DC capacitor 2*a* and the second DC capacitor 2*b* such that the difference between the distance from the positive terminal Ca of the first switching element 1*a* to the positive terminal Pa of the first DC capacitor 2*a* and the distance from the positive terminal Ca of the first switching element 1*a* to the positive terminal Pb of the second DC capacitor 2*b* is equal to the difference between the distance from the negative terminal Eb of the second switching element 1*b* to the negative terminal Na of the first DC capacitor 2*a* and the distance from the negative terminal Eb of the second switching element 1*b* to the negative terminal Nb of the second DC capacitor 2*b*.

Figure 7:
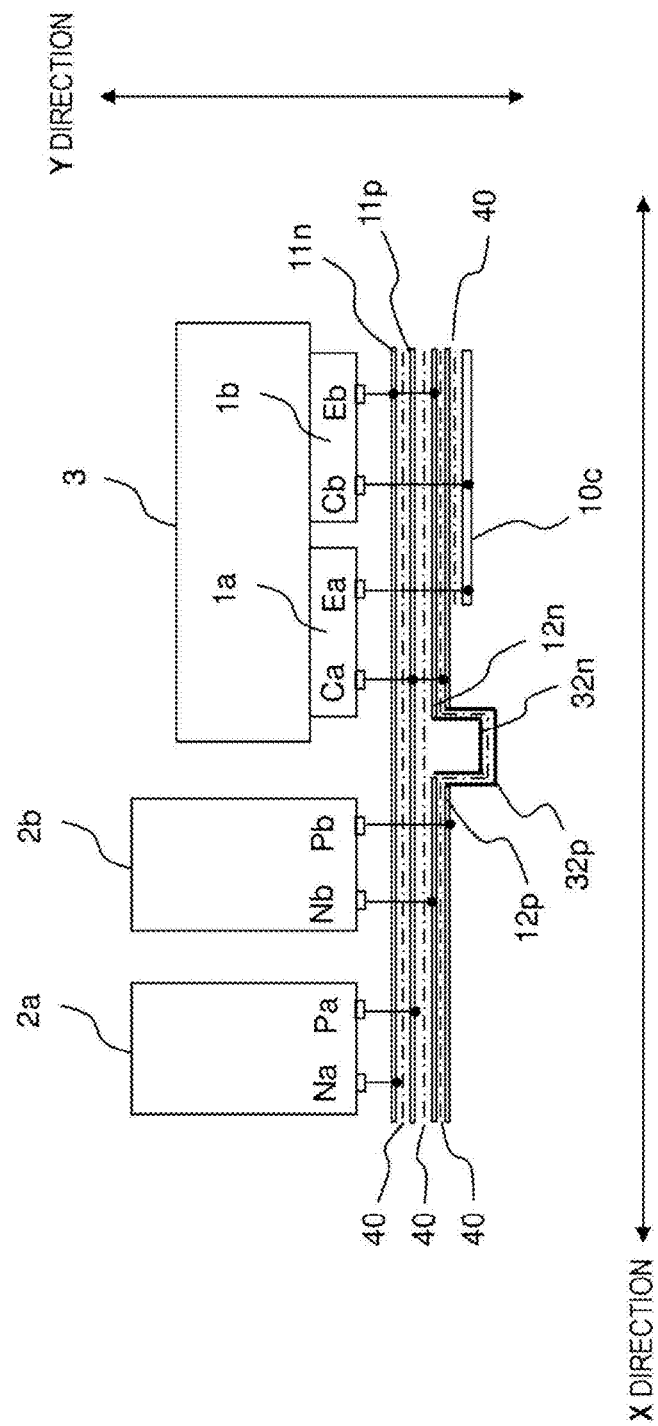
FIG. 7 is a schematic diagram showing still another configuration of the power conversion device according to embodiment 1.

FIG. 7 is a schematic diagram showing still another component configuration of the power conversion device according to embodiment 1. As shown in FIG. 7, either of the first switching element 1*a* and the second switching element 1*b* may be disposed closer to the DC capacitors as long as the negative terminal Ea of the first switching element 1*a* and the positive terminal Cb of the second switching element 1*b* are connected to each other. Further, regarding the switching elements, the sequence of the positive terminal and the negative terminal may be reversed between the switching elements.

As described above, the sequence of the first switching element 1*a* and the second switching element 1*b* and the sequence of the positive terminal and the negative terminal thereof, are not limited in terms of order. Meanwhile, the sequence of the positive terminal and the negative terminal is preferably the same between the first DC capacitor 2*a* and the second DC capacitor 2*b*.

Wiring inductances shown in the equivalent circuit in FIG. 4 are present between the terminals on the busbars. Specifically, a wiring inductance Lp1 is present on the first positive-side busbar 11*p*, a wiring inductance Ln1 is present on the first negative-side busbar 11*n*, a wiring inductance Lpb of the inductance adjustment portion 32*p* and another wiring inductance Lp2 are present on the second positive-side busbar 12p, and a wiring inductance Lnb of the inductance adjustment portion 32n and another wiring inductance Ln2 are present on the second negative-side busbar 12n.

Regarding the above wiring inductances between the switching elements and the DC capacitors based on the arrangement of the switching elements and the DC capacitors, the lengths of the inductance adjustment portions are adjusted such that: the wiring inductances on the second positive-side busbar (adjustment positive-side busbar) 12p, i.e., the wiring inductance Lp2 and the wiring inductance Lpb of the inductance adjustment portion 32p, are equal to the wiring inductance Lp1 on the first positive-side busbar; and the wiring inductances on the second negative-side busbar (adjustment negative-side busbar) 12n, i.e., the wiring inductance Ln2 and the wiring inductance Lnb of the inductance adjustment portion 32n, are equal to the wiring inductance Ln1 on the first negative-side busbar. That is, in the inductance adjustment portion 32p and the inductance adjustment portion 32n, the lengths from the switching elements to the DC capacitors are adjusted by bending or curving the inductance adjustment portions, whereby variation in current between the DC capacitors can be eliminated.

Further, the above busbar configuration leads to presence of two busbars in which different currents flow through: a path between each switching element and the first DC capacitor 2a; and a path between the switching element and the second DC capacitor 2b. Consequently, the value of current flowing in each busbar is half the value in a conventional busbar configuration and, with a thickness dimension being equal to a conventional thickness dimension, heat generated from the busbar at the same level of current is lower than in the conventional busbar configuration, whereby output current of the power conversion device can be increased. Meanwhile, if the same level of heat generation as that in the conventional busbar configuration can be performed, the thickness dimension of each busbar can be set to half the conventional thickness dimension. Thus, machining work such as bending of the busbars becomes easy, and the weight of each single busbar is decreased, whereby assembling work becomes easy.

Figure 8:
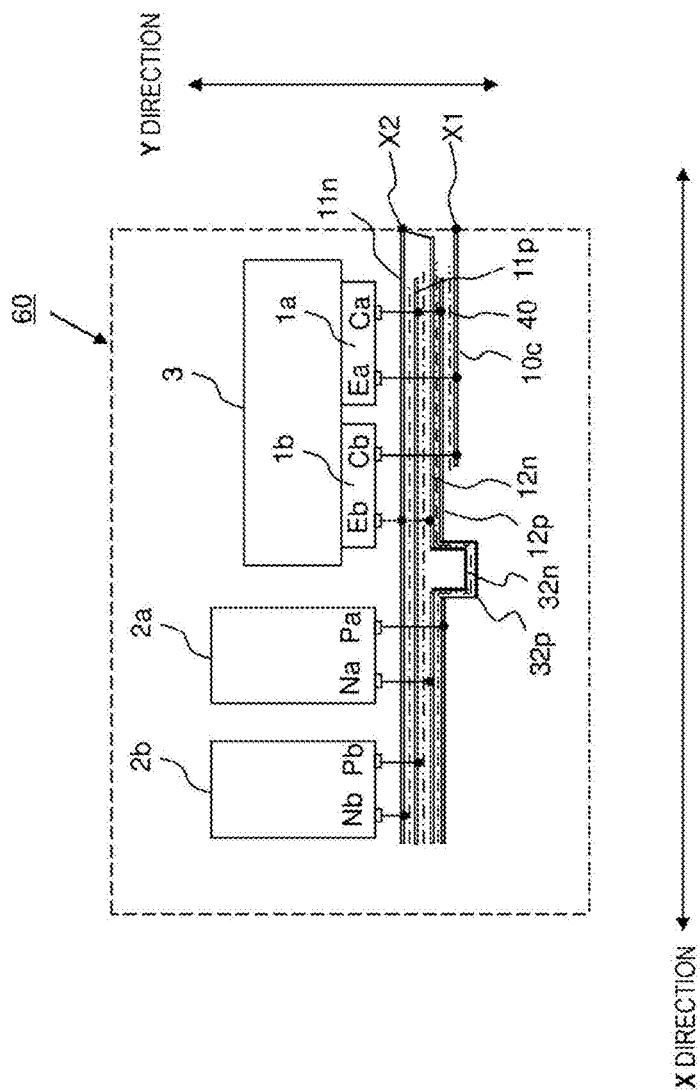
FIG. 8 is a schematic diagram showing a configuration in a case where the power conversion device according to embodiment 1 is configured as a cell converter.
Figure 9:
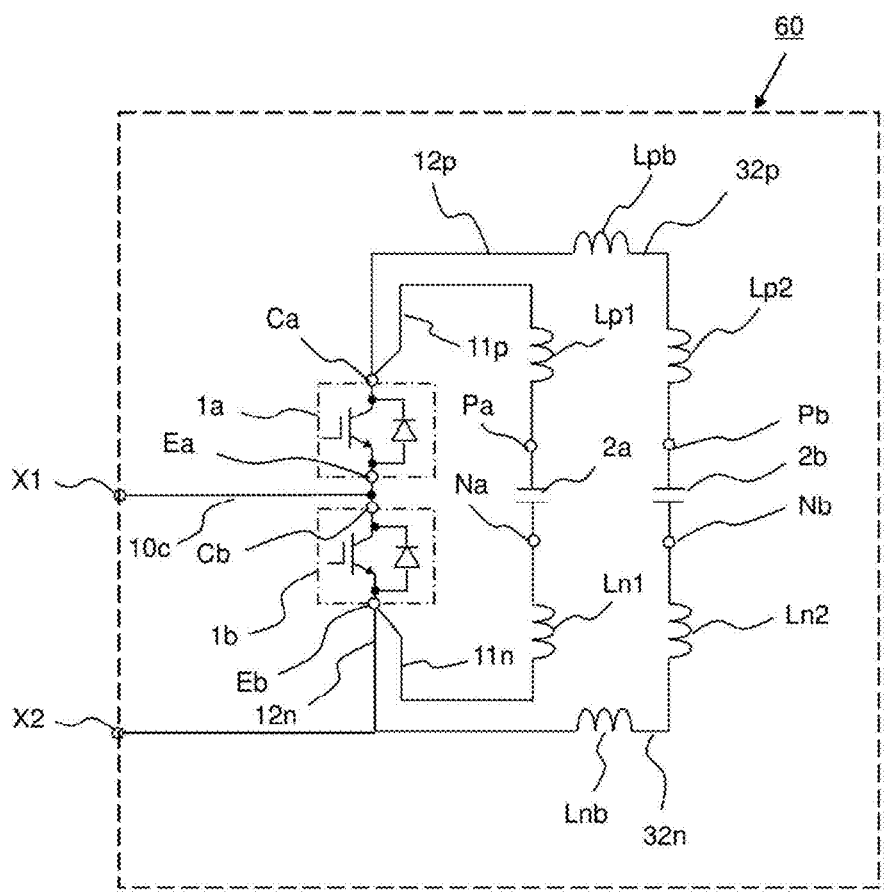
FIG. 9 is a circuit diagram showing an equivalent circuit in the case where the power conversion device according to embodiment 1 is configured as the cell converter.

FIG. 8 is a schematic diagram showing a configuration in a case where the power conversion device according to embodiment 1 is configured as a cell converter 60. FIG. 9 is a diagram showing an equivalent circuit of the cell converter 60. FIG. 8 and FIG. 9 are different from FIG. 1 and FIG. 4 in that: an external terminal X1 is provided at a position, on the midpoint busbar 10c, that is an end portion of the cell converter 60; and an external terminal X2 is provided at a position that is an end portion of the cell converter 60 and at which the first negative-side busbar 11n and the second negative-side busbar 12n are connected to each other. The external terminal X1 and the external terminal X2 are located on a front side of the cell converter 60.

Figure 10:
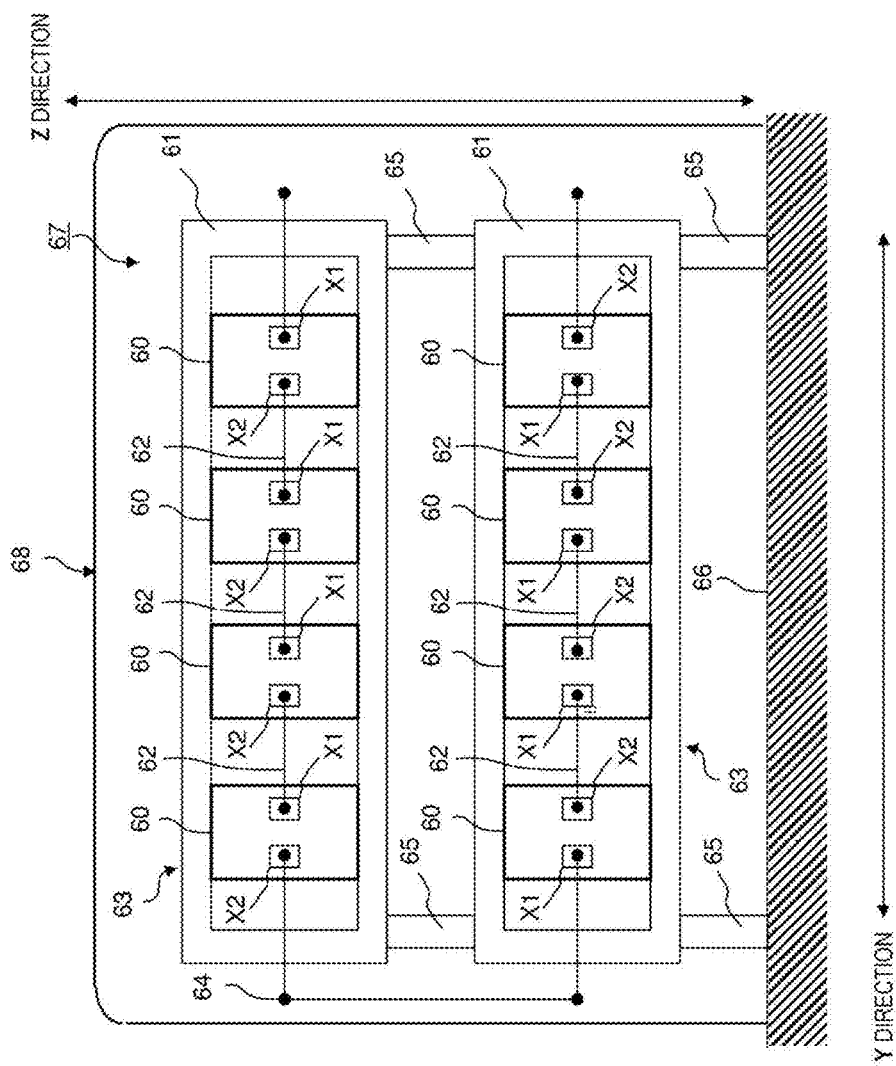
FIG. 10 is a schematic diagram showing a configuration of a power conversion device intended for HVDCs, in which the power conversion device according to embodiment 1 is used as the cell converter.

FIG. 10 is a schematic diagram showing an arrangement configuration of a general power conversion device intended for HVDCs and shows a connection configuration in which a plurality of cell converters 60 each of which is the cell converter 60 shown in FIG. 8 are used. The plurality of cell converters 60 are aligned in a horizontal Y direction and accommodated in one cell converter housing 61. FIG. 10 shows an example in which four cell converters 60 are accommodated in one cell converter housing 61. As described above, each cell converter 60 has the external terminal X1 and the external terminal X2. The external terminal X1 of the cell converter 60 and the external terminal X2 of another cell converter 60 adjacent thereto are connected to each other via an inter-cell-converter connection conductor 62, and the external terminal X2 of the other cell converter 60 and the external terminal X1 of still another cell converter 60 adjacent thereto are connected to each other via an inter-cell-converter connection conductor 62, whereby the plurality of cell converters 60 are connected in series. This component in which the plurality of cell converters 60 accommodated in the cell converter housing 61 are connected in series, i.e., connected in cascade, is referred to as a valve 63. In order to increase output voltage, a plurality of the valves 63 are stacked in the vertical direction (height direction, Z direction) and connected to each other via an inter-valve connection conductor 64 so that the number of the cell converters 60 that are connected in series can be set to be further larger than in a configuration provided with only one valve. Insulating structures 65 are disposed between the valves 63 so as not to cause an electrical short-circuit between the highest potential among those of the cell converters 60 connected in cascade and another reference potential, whereby the distances to the other valve 63 and a reference potential 66 are ensured. A structure composed of the plurality of valves 63 and the plurality of insulating structures 65 is referred to as a valve tower 67. The valve tower 67 is accommodated in a valve hall 68 so as not to be directly influenced by external environments, e.g., rain and temperature.

In the above configuration, the dimension in the Y direction of each cell converter 60 does not increase even if the number of the DC capacitors that are in parallel is increased as described later in embodiment 2 and embodiment 3. Thus, increase in the dimension in the Y direction of each cell converter housing 61 can be avoided. Meanwhile, even if a restriction is imposed on the dimension in the Y direction of the cell converter housing 61, the number of the cell converters 60 that can be accommodated in the cell converter housing 61 does not have to be decreased. Since the number of the cell converters 60 in each one of the valves 63 is not decreased, no valves 63 need to be additionally provided in the vertical direction so that the height of the valve tower 67 does not increase, either. Thus, the distance between the valve tower 67 and a ceiling portion of the valve hall 68 does not narrow, either. Therefore, even if the rated output current of a single cell converter 60 is increased, no problem arises in that the output of the entire power conversion device is decreased.

Embodiment 2

Figure 11:
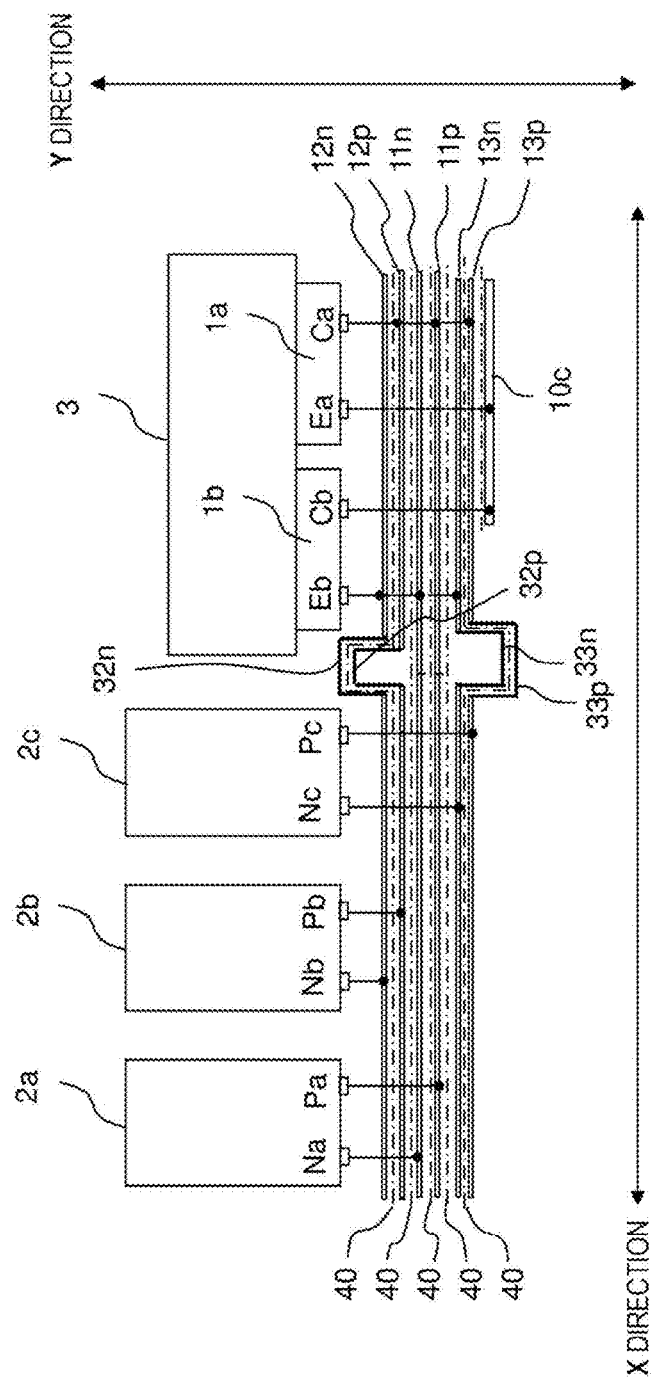
FIG. 11 is a first schematic diagram showing a configuration of a power conversion device according to embodiment 2.
Figure 12:
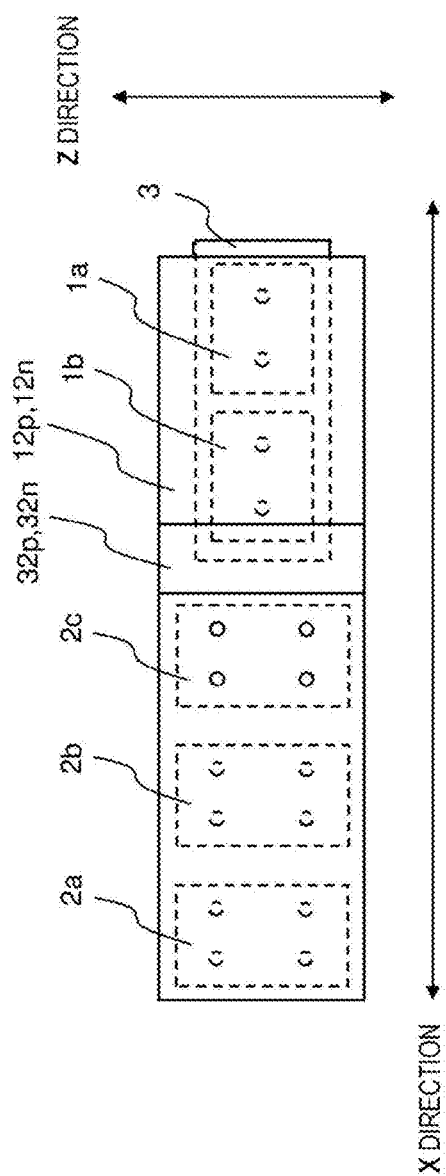
FIG. 12 is a second schematic diagram showing the configuration of the power conversion device according to embodiment 2.
Figure 13:
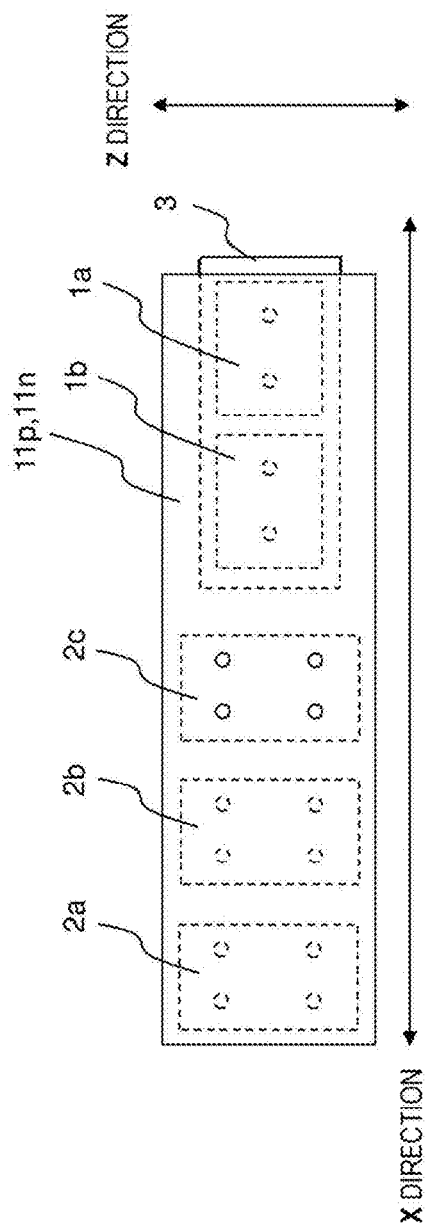
FIG. 13 is a third schematic diagram showing the configuration of the power conversion device according to embodiment 2.
Figure 14:
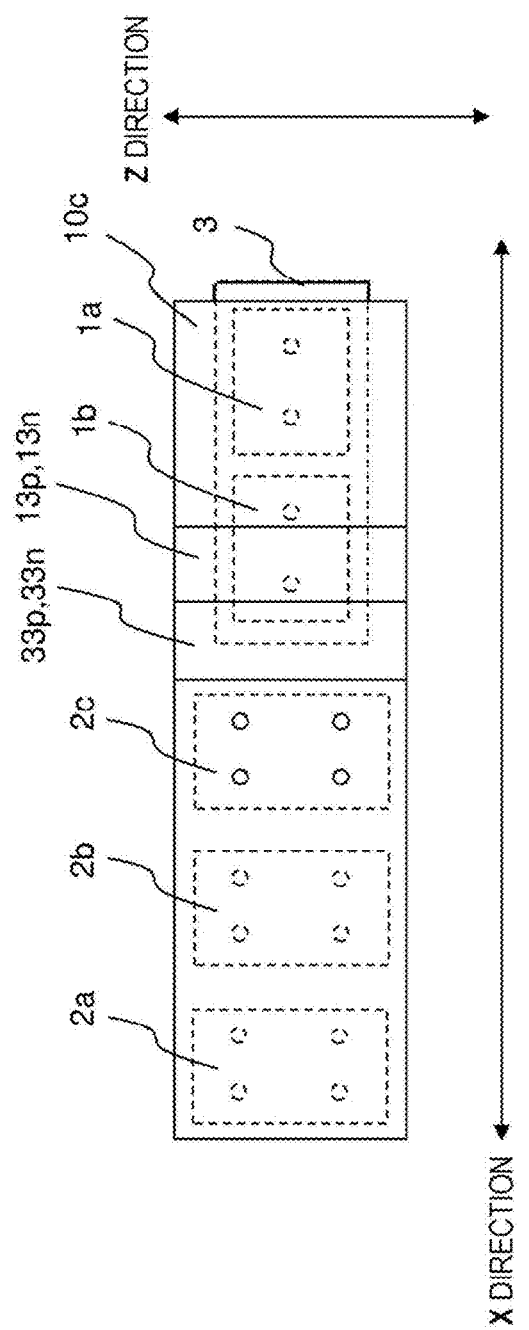
FIG. 14 is a fourth schematic diagram showing the configuration of the power conversion device according to embodiment 2.
Figure 15:
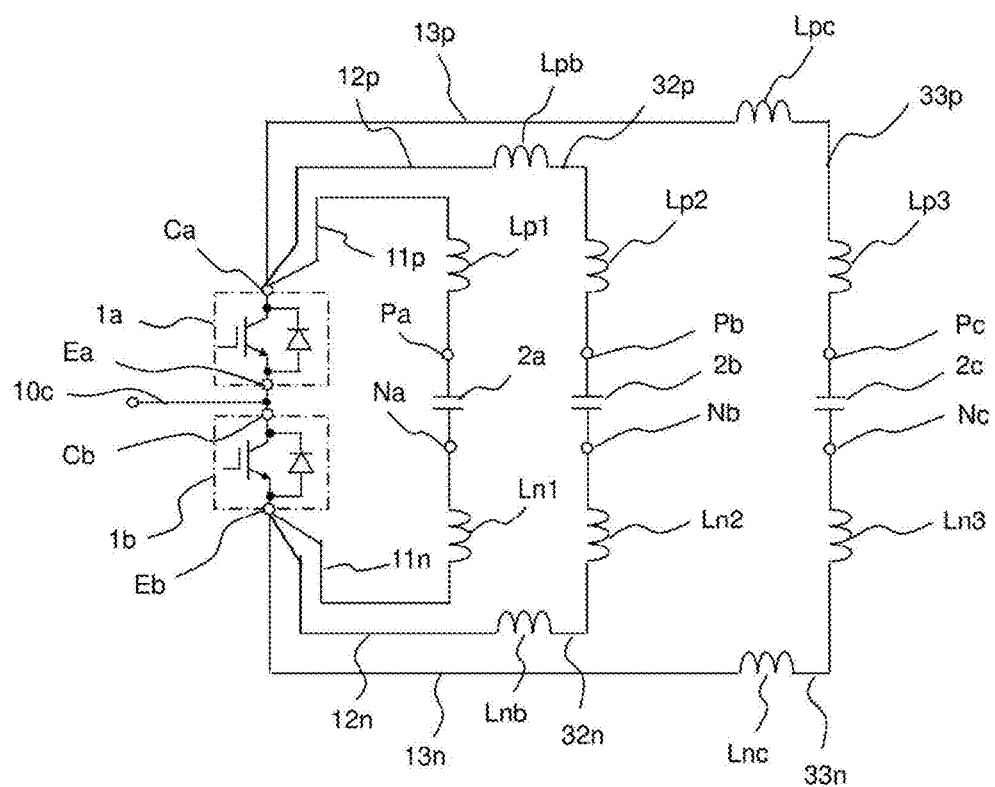
FIG. 15 is a circuit diagram showing an equivalent circuit of the power conversion device according to embodiment 2.

FIG. 11 to FIG. 14 are schematic diagrams showing a component configuration of a power conversion device according to embodiment 2. FIG. 11 is a top view, FIG. 12 to FIG. 14 are side views, and FIG. 12 and FIG. 13 are side views in which some busbars are excluded from busbars shown in FIG. 11. FIG. 15 is a circuit diagram showing an equivalent circuit of the power conversion device shown in FIG. 11 to FIG. 14. That is, FIG. 11 to FIG. 14 are schematic diagrams in which the components on the circuit shown in FIG. 15 are disposed. The power conversion device according to the present embodiment 2 is a power conversion device in which the number of the DC capacitors is increased by one from the number in the power conversion device according to embodiment 1, i.e., the number of the DC capacitors is three. The first switching element 1a and the second switching element 1b are the same components as those in embodiment 1. The three DC capacitors, i.e., the first DC capacitor 2a, the second DC capacitor 2b, and a third DC capacitor 2c, are provided as DC capacitors. Here, the first switching element 1a, the second switching element 1b, the first DC capacitor 2a, the second DC capacitor 2b, and the third DC capacitor 2c have respective positive terminals and respective negative terminals, and are disposed in a straight line in the X direction such that all of the positive terminals and the negative terminals are aligned on the same side. The first switching element 1a and the second switching element 1b are adjacent to each other, the first DC capacitor 2a, the second DC capacitor 2b, and the third DC capacitor 2c are disposed in this order, and the DC capacitor disposed farthest from the switching elements is defined as the first DC capacitor 2a.

These electrical components are electrically connected to each other by busbars in order to form the circuit in FIG. 15. The midpoint busbar 10c makes bridge connection between the negative terminal Ea of the first switching element 1a and the positive terminal Cb of the second switching element 1b. The positive terminal Ca of the first switching element 1a and the positive terminal Pa of the first DC capacitor 2a are electrically connected to each other by the first positive-side busbar 11p, the positive terminal Ca of the first switching element 1a and the positive terminal Pb of the second DC capacitor 2b are electrically connected to each other by the second positive-side busbar 12p, and the positive terminal Ca of the first switching element 1a and each of positive terminals Pc of the third DC capacitor 2c are electrically connected to each other by a third positive-side busbar 13p. The negative terminal Eb of the second switching element 1b and the negative terminal Na of the first DC capacitor 2a are electrically connected to each other by the first negative-side busbar 11n, the negative terminal Eb of the second switching element 1b and the negative terminal Nb of the second DC capacitor 2b are electrically connected to each other by the second negative-side busbar 12n, and the negative terminal Eb of the second switching element 1b and each of negative terminals Nc of the third DC capacitor 2c are electrically connected to each other by a third negative-side busbar 13n.

Here, the second positive-side busbar 12p has the inductance adjustment portion 32p providing a bypass such that the length on the second positive-side busbar 12p between the positive terminal Ca of the first switching element 1a and the positive terminal Pb of the second DC capacitor 2b is longer than the straight distance between the positive terminal Ca of the first switching element 1a and the positive terminal Pb of the second DC capacitor 2b. The second positive-side busbar 12p having the inductance adjustment portion 32p is sometimes referred to also as the adjustment positive-side busbar 12p. Further, the second negative-side busbar 12n has the inductance adjustment portion 32n providing a bypass such that the length on the second negative-side busbar 12n between the negative terminal Eb of the second switching element 1b and the negative terminal Nb of the second DC capacitor 2b is longer than the straight distance between the negative terminal Eb of the second switching element 1b and the negative terminal Nb of the second DC capacitor 2b. The second negative-side busbar 12n having the inductance adjustment portion 32n is sometimes referred to also as the adjustment negative-side busbar 12n.

Likewise, the third positive-side busbar 13p has an inductance adjustment portion 33p providing a bypass such that a length on the third positive-side busbar 13p between the positive terminal Ca of the first switching element 1a and the positive terminal Pc of the third DC capacitor 2c is longer than a straight distance between the positive terminal Ca of the first switching element 1a and the positive terminal Pc of the third DC capacitor 2c. The third positive-side busbar 13p having the inductance adjustment portion 33p is sometimes referred to also as an adjustment positive-side busbar 13p. Further, the third negative-side busbar 13n has an inductance adjustment portion 33n providing a bypass such that a length on the third negative-side busbar 13n between the negative terminal Eb of the second switching element 1b and the negative terminal Nc of the third DC capacitor 2c is longer than a straight distance between the negative terminal Eb of the second switching element 1b and the negative terminal Nc of the third DC capacitor 2c. The third negative-side busbar 13n having the inductance adjustment portion 33n is sometimes referred to also as an adjustment negative-side busbar 13n.

Each busbar is formed of, for example, a sheet-shaped metal. The positive-side busbar and the negative-side busbar which are connected to each DC capacitor, are disposed in a superposed manner such that sheet surfaces of the busbars face each other with an insulating member 40 (indicated by an alternate long and short dash line) being interposed therebetween. Specifically, the first positive-side busbar 11p and the first negative-side busbar 11n are disposed in a superposed manner with the insulating member 40 being interposed therebetween, the second positive-side busbar 12p and the second negative-side busbar 12n are disposed in a superposed manner with the insulating member 40 being interposed therebetween, and the third positive-side busbar 13p and the third negative-side busbar 13n are disposed in a superposed manner with an insulating member 40 being interposed therebetween. Further, the set of two busbars connected to the first DC capacitor 2a, the set of two busbars connected to the second DC capacitor 2b, and the set of two busbars connected to the third DC capacitor 2c may be disposed in a superposed manner with insulating members 40 being interposed between the respective sets.

FIG. 11 shows a configuration in which the set of busbars connected to the first DC capacitor 2a disposed farthest is disposed between the set of busbars connected to the second DC capacitor 2b and the set of busbars connected to the third DC capacitor 2c. However, the order of disposing the busbars is not limited thereto. For example, it is also possible that: the set of busbars connected to the first DC capacitor 2a disposed farthest is disposed closest to the electrical components; the set of busbars connected to the second DC capacitor 2b is disposed next to the closest set; and the set of busbars connected to the third DC capacitor 2c is disposed on the outermost side. Alternatively, it is also possible to employ an arrangement in which the set of busbars connected to the second DC capacitor 2b and the set of busbars connected to the third DC capacitor 2c in FIG. 11 are interchanged.

Further, although the second switching element 1b is disposed closer to the DC capacitors than the first switching element 1a is, the positions of the switching elements may be reversed. Furthermore, regarding the sequences of the positive terminals and the negative terminals of the respective switching elements, the sequence of the positive terminal and the negative terminal of one of the switching elements may be opposite to the sequence shown in FIG. 11, or the sequences of the positive terminals and the negative terminals of both the first switching element 1a and the second switching element 1b may be opposite to the sequences shown in FIG. 11. The same applies to the DC capacitors. That is, the sequences of the positive terminals and the negative terminals of the DC capacitors are not limited to the sequences shown in FIG. 11. However, the difference between the distance from the positive terminal Ca of the first switching element 1a to the positive terminal Pa of the first DC capacitor 2a and the distance from the positive terminal Ca of the first switching element 1a to the positive terminal Pb of the second DC capacitor 2b is preferably equal to the difference between the distance from the negative terminal Eb of the second switching element 1b to the negative terminal Na of the first DC capacitor 2a and the distance from the negative terminal Eb of the second switching element 1b to the negative terminal Nb of the second DC capacitor 2b. The same applies to the third DC capacitor 2c, and the sequence of the positive terminal and the negative terminal is preferably the same among the three DC capacitors.

Figure 16A:
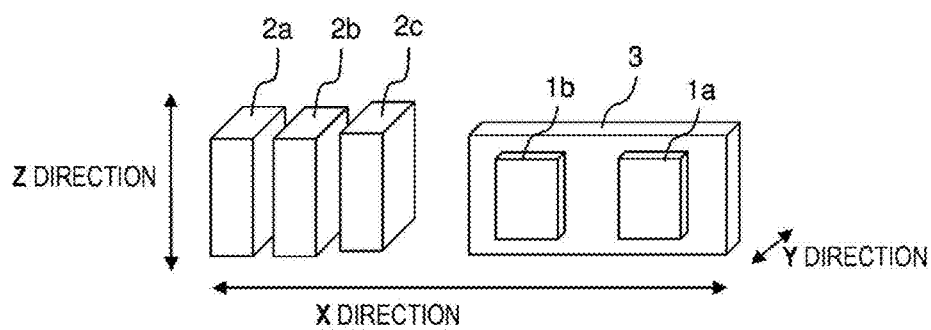
FIG. 16A is a first diagram for explaining a busbar connection state in the power conversion device according to embodiment 2.
Figure 16B:
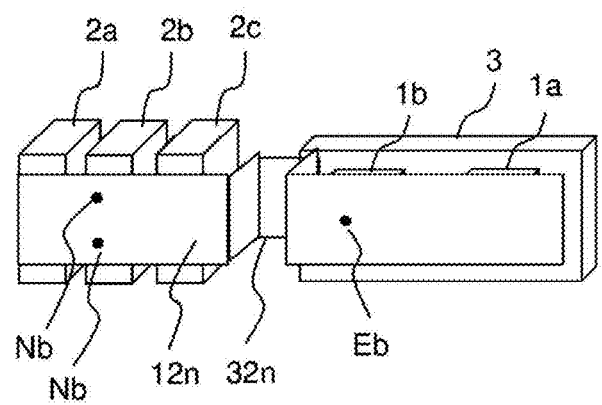
FIG. 16B is a second diagram for explaining the busbar connection state in the power conversion device according to embodiment 2.
Figure 16C:
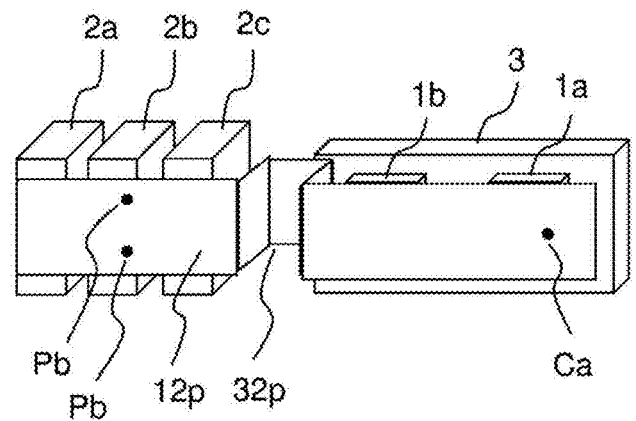
FIG. 16C is a third diagram for explaining the busbar connection state in the power conversion device according to embodiment 2.
Figure 16D:
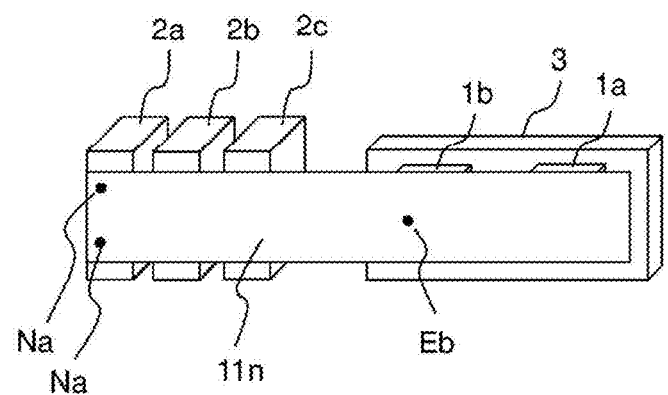
FIG. 16D is a fourth diagram for explaining the busbar connection state in the power conversion device according to embodiment 2.
Figure 16E:
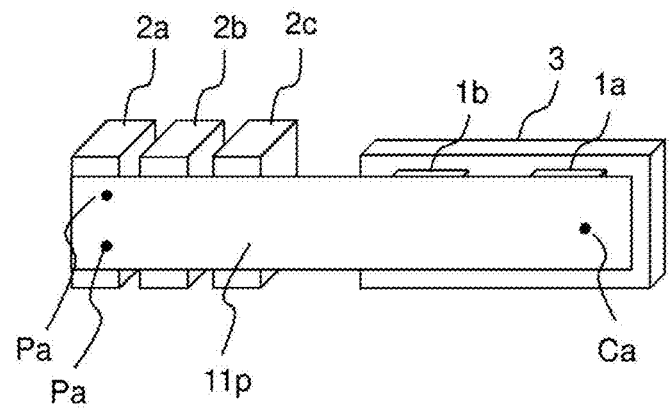
FIG. 16E is a fifth diagram for explaining the busbar connection state in the power conversion device according to embodiment 2.
Figure 16F:
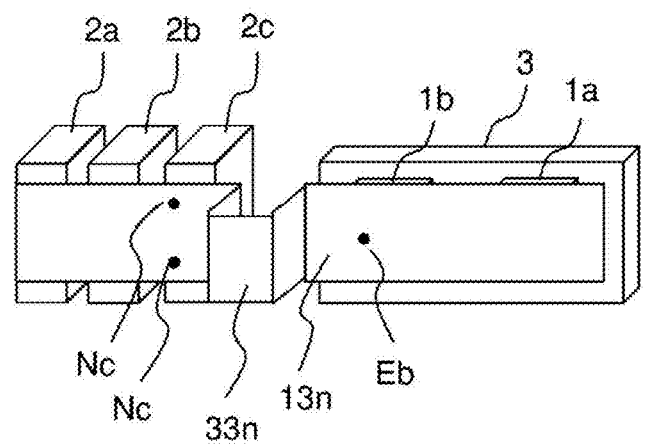
FIG. 16F is a sixth diagram for explaining the busbar connection state in the power conversion device according to embodiment 2.
Figure 16G:
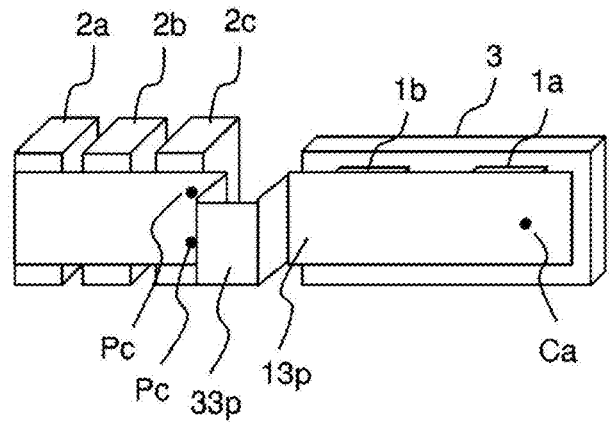
FIG. 16G is a seventh diagram for explaining the busbar connection state in the power conversion device according to embodiment 2.
Figure 16H:
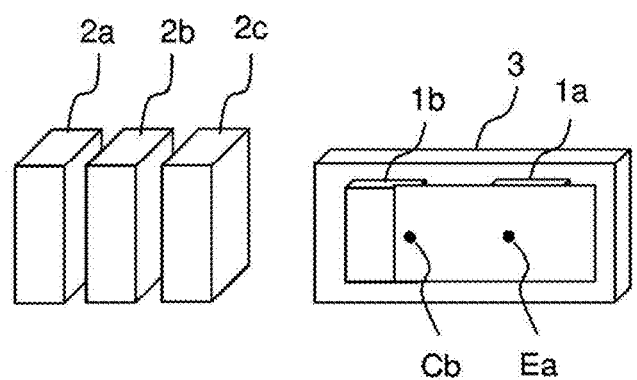
FIG. 16H is an eighth diagram for explaining the busbar connection state in the power conversion device according to embodiment 2.

FIG. 16A to FIG. 16H are perspective views showing the states of the busbars in an easily understandable manner. FIG. 16A shows a state where no busbar is present. FIG. 16B shows a state where the negative terminal Eb of the second switching element 1b and the negative terminal Nb of the second DC capacitor 2b are connected to each other by the second negative-side busbar 12n having the inductance adjustment portion 32n. FIG. 16C shows a state where the positive terminal Ca of the first switching element 1a and the positive terminal Pb of the second DC capacitor 2b are connected to each other by the second positive-side busbar 12p having the inductance adjustment portion 32p. FIG. 16D shows a state where the negative terminal Eb of the second switching element 1b and the negative terminal Na of the first DC capacitor 2a are connected to each other by the first negative-side busbar 11n. FIG. 16E shows a state where the positive terminal Ca of the first switching element 1a and the positive terminal Pa of the first DC capacitor 2a are connected to each other by the first positive-side busbar 11p. FIG. 16F shows a state where the negative terminal Eb of the second switching element 1b and the negative terminal Nc of the third DC capacitor 2c are connected to each other by the third negative-side busbar 13n having the inductance adjustment portion 33n. FIG. 16G shows a state where the positive terminal Ca of the first switching element 1a and the positive terminal Pc of the third DC capacitor 2c are connected to each other by the third positive-side busbar 13p having the inductance adjustment portion 33p. FIG. 16H shows a state where the negative terminal Ea of the first switching element 1a and the positive terminal Cb of the second switching element 1b are connected to each other by the midpoint busbar 10c.

Wiring inductances shown in the equivalent circuit in FIG. 15 are present between the terminals on the busbars. Specifically, the wiring inductance Lp1 is present on the first positive-side busbar 11p, the wiring inductance Ln1 is present on the first negative-side busbar 11n, the wiring inductance Lpb of the inductance adjustment portion 32p and the other wiring inductance Lp2 are present on the second positive-side busbar 12p, the wiring inductance Lnb of the inductance adjustment portion 32n and the other wiring inductance Ln2 are present on the second negative-side busbar 12n, a wiring inductance Lpc of the inductance adjustment portion 33p and another wiring inductance Lp3 are present on the third positive-side busbar 13p, and a wiring inductance Lnc of the inductance adjustment portion 33n and another wiring inductance Ln3 are present on the third negative-side busbar 13n.

Regarding the above wiring inductances between the switching elements and the DC capacitors based on the arrangement of the switching elements and the DC capacitors, the lengths of the inductance adjustment portions are adjusted such that: the wiring inductances on the second positive-side busbar (adjustment positive-side busbar) 12p, i.e., the wiring inductance Lp2 and the wiring inductance Lpb of the inductance adjustment portion 32p, are equal to the wiring inductance Lp1 on the first positive-side busbar 11p; and the wiring inductances on the third positive-side busbar (adjustment positive-side busbar) 13p, i.e., the wiring inductance Lp3 and the wiring inductance Lpc of the inductance adjustment portion 33p, are equal to the wiring inductance Lp1 on the first positive-side busbar 11p. Likewise, the lengths of the inductance adjustment portions are adjusted such that: the wiring inductances on the second negative-side busbar (adjustment negative-side busbar) 12n, i.e., the wiring inductance Ln2 and the wiring inductance Lnb of the inductance adjustment portion 32n, are equal to the wiring inductance Ln1 on the first negative-side busbar 11n; and the wiring inductances on the third negative-side busbar (adjustment negative-side busbar) 13n, i.e., the wiring inductance Ln3 and the wiring inductance Lnc of the inductance adjustment portion 33n, are equal to the wiring inductance Ln1 on the first negative-side busbar 11n. That is, in the inductance adjustment portion 32p and the inductance adjustment portion 32n, and the inductance adjustment portion 33p and the inductance adjustment portion 33n, the lengths from the switching elements to the DC capacitors are adjusted by bending or curving the inductance adjustment portions, whereby variation in current among the DC capacitors can be eliminated.

Further, the above busbar configuration leads to presence of three busbars in which different currents flow through: a path between each switching element and the first DC capacitor 2a; a path between the switching element and the second DC capacitor 2b; and a path between the switching element and the third DC capacitor 2c. Consequently, the value of current flowing in each busbar is one third of the value in the conventional busbar configuration and, with the thickness dimension being kept unchanged from the conventional thickness dimension, heat generation from the busbar is less likely to occur, whereby the output current of the power conversion device can be increased. Meanwhile, if the same level of heat generation as that in the conventional busbar configuration can be performed, the thickness dimension of each busbar can be set to one third of the conventional thickness dimension. Thus, it is possible to solve the problems that machining work such as bending of the busbars becomes difficult, assembling work becomes difficult owing to increase in the weight of each single busbar, and other work becomes difficult.

In the case where the power conversion device is applied to the power conversion device intended for HVDCs shown in FIG. 10, the dimension in the Y direction of each cell converter 60 does not increase even if the number of the DC capacitors that are in parallel is increased. Thus, increase in the dimension in the Y direction of each cell converter housing 61 can be avoided. Meanwhile, even if a restriction is imposed on the dimension in the Y direction of the cell converter housing 61, the number of the cell converters 60 that can be accommodated in the cell converter housing 61 does not have to be decreased. Since the number of the cell converters 60 in each one of the valves is not decreased, no valves need to be additionally provided in the height direction so that the height of the valve tower 67 does not increase, either. Thus, the distance between the valve tower 67 and the ceiling portion of the valve hall 68 does not narrow, either. Therefore, even if the rated output current of a single cell converter 60 is increased, no problem arises in that the output of the entire power conversion device is decreased.

Embodiment 3

Figure 17:
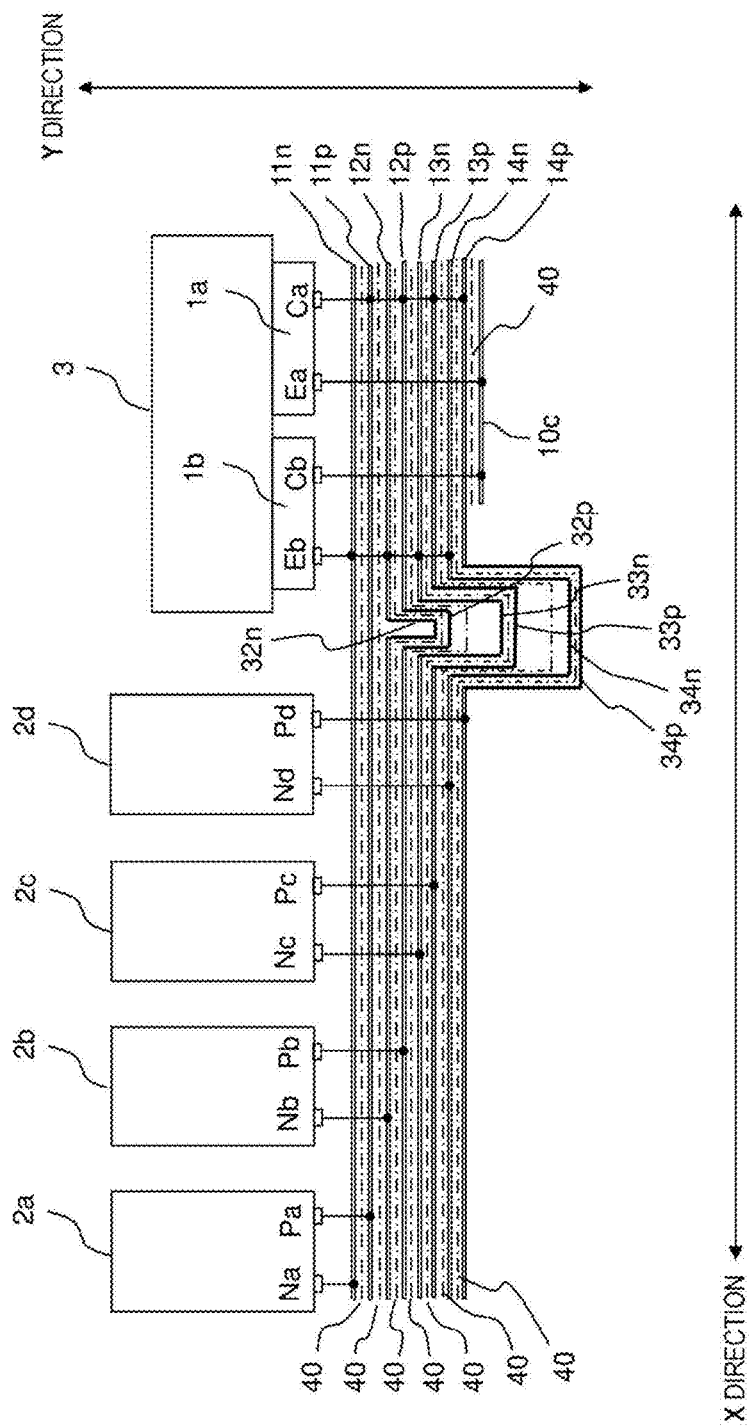
FIG. 17 is a schematic diagram showing a configuration of a power conversion device according to embodiment 3.

FIG. 17 is a schematic diagram showing a component configuration of a power conversion device according to embodiment 3. The power conversion device according to the present embodiment 3 is a power conversion device in which the number of the DC capacitors is further increased by one from the number in the power conversion device according to embodiment 2, i.e., the number of the DC capacitors is four. The first switching element 1a and the second switching element 1b are the same components as those in embodiment 1 and embodiment 2. Four DC capacitors, i.e., the first DC capacitor 2a, the second DC capacitor 2b, the third DC capacitor 2c, and a fourth DC capacitor 2d, are provided as DC capacitors. Here, the first switching element 1a, the second switching element 1b, the first DC capacitor 2a, the second DC capacitor 2b, the third DC capacitor 2c, and the fourth DC capacitor 2d have respective positive terminals and respective negative terminals, and are disposed in a straight line in the X direction such that all of the positive terminals and the negative terminals are aligned on the same side. The first switching element 1a and the second switching element 1b are adjacent to each other, the first DC capacitor 2a, the second DC capacitor 2b, the third DC capacitor 2c, and the fourth DC capacitor 2d are disposed in this order, and the DC capacitor disposed farthest from the switching elements is defined as the first DC capacitor 2a.

These electrical components are electrically connected to each other by busbars as shown in FIG. 17. The midpoint busbar 10c makes bridge connection between the negative terminal Ea of the first switching element 1a and the positive terminal Cb of the second switching element 1b. The positive terminal Ca of the first switching element 1a and the positive terminal Pa of the first DC capacitor 2a are electrically connected to each other by the first positive-side busbar 11p, the positive terminal Ca of the first switching element 1a and the positive terminal Pb of the second DC capacitor 2b are electrically connected to each other by the second positive-side busbar 12p, the positive terminal Ca of the first switching element 1a and the positive terminal Pc of the third DC capacitor 2c are electrically connected to each other by the third positive-side busbar 13p, and the positive terminal Ca of the first switching element 1a and each of positive terminals Pd of the fourth DC capacitor 2d are electrically connected to each other by a fourth positive-side busbar 14p. The negative terminal Eb of the second switching element 1b and the negative terminal Na of the first DC capacitor 2a are electrically connected to each other by the first negative-side busbar 11n, the negative terminal Eb of the second switching element 1b and the negative terminal Nb of the second DC capacitor 2b are electrically connected to each other by the second negative-side busbar 12n, the negative terminal Eb of the second switching element 1b and the negative terminal Nc of the third DC capacitor 2c are electrically connected to each other by the third negative-side busbar 13n, and the negative terminal Eb of the second switching element 1b and each of negative terminals Nd of the fourth DC capacitor 2d are electrically connected to each other by a fourth negative-side busbar 14n.

Here, the second positive-side busbar 12p has the inductance adjustment portion 32p providing a bypass such that the length on the second positive-side busbar 12p between the positive terminal Ca of the first switching element 1a and the positive terminal Pb of the second DC capacitor 2b is longer than the straight distance between the positive terminal Ca of the first switching element 1a and the positive terminal Pb of the second DC capacitor 2b. The second positive-side busbar 12p having the inductance adjustment portion 32p is sometimes referred to also as the adjustment positive-side busbar 12p. Further, the second negative-side busbar 12n has the inductance adjustment portion 32n providing a bypass such that the length on the second negative-side busbar 12n between the negative terminal Eb of the second switching element 1b and the negative terminal Nb of the second DC capacitor 2b is longer than the straight distance between the negative terminal Eb of the second switching element 1b and the negative terminal Nb of the second DC capacitor 2b. The second negative-side busbar 12n having the inductance adjustment portion 32n is sometimes referred to also as the adjustment negative-side busbar 12n.

Likewise, the third positive-side busbar 13p has the inductance adjustment portion 33p providing a bypass such that the length on the third positive-side busbar 13p between the positive terminal Ca of the first switching element 1a and the positive terminal Pc of the third DC capacitor 2c is longer than the straight distance between the positive terminal Ca of the first switching element 1a and the positive terminal Pc of the third DC capacitor 2c. The third positive-side busbar 13p having the inductance adjustment portion 33p is sometimes referred to also as the adjustment positive-side busbar 13p. Further, the third negative-side busbar 13n has the inductance adjustment portion 33n providing a bypass such that the length on the third negative-side busbar 13n between the negative terminal Eb of the second switching element 1b and the negative terminal Nc of the third DC capacitor 2c is longer than the straight distance between the negative terminal Eb of the second switching element 1b and the negative terminal Nc of the third DC capacitor 2c. The third negative-side busbar 13n having the inductance adjustment portion 33n is sometimes referred to also as the adjustment negative-side busbar 13n.

Moreover, the fourth positive-side busbar 14p has an inductance adjustment portion 34p providing a bypass such that a length on the fourth positive-side busbar 14p between the positive terminal Ca of the first switching element 1a and the positive terminal Pd of the fourth DC capacitor 2d is longer than a straight distance between the positive terminal Ca of the first switching element 1a and the positive terminal Pd of the fourth DC capacitor 2d. The fourth positive-side busbar 14p having the inductance adjustment portion 34p is sometimes referred to also as an adjustment positive-side busbar 14p. Further, the fourth negative-side busbar 14n has an inductance adjustment portion 34n providing a bypass such that a length on the fourth negative-side busbar 14n between the negative terminal Eb of the second switching element 1b and the negative terminal Nd of the fourth DC capacitor 2d is longer than a straight distance between the negative terminal Eb of the second switching element 1b and the negative terminal Nd of the fourth DC capacitor 2d. The fourth negative-side busbar 14n having the inductance adjustment portion 34n is sometimes referred to also as an adjustment negative-side busbar 14n.

The lengths of the inductance adjustment portions are adjusted such that inductances, on each adjustment positive-side busbar, between the positive terminal Ca of the first switching element 1a and the positive terminal of the corresponding DC capacitor are equal to the inductance between the positive terminal Ca of the first switching element 1a and the positive terminal Pa of the first DC capacitor 2a. Likewise, the lengths of the inductance adjustment portions are adjusted such that inductances, on each adjustment negative-side busbar, between the negative terminal Eb of the second switching element 1b and the negative terminal of the corresponding DC capacitor are equal to the inductance between the negative terminal Eb of the second switching element 1b and the negative terminal Na of the first DC capacitor 2a. That is, in the inductance adjustment portion 32p and the inductance adjustment portion 32n, the inductance adjustment portion 33p and the inductance adjustment portion 33n, and the inductance adjustment portion 34p and the inductance adjustment portion 34n, the lengths from the switching elements to the DC capacitors are adjusted by bending or curving the inductance adjustment portions, whereby variation in current among the DC capacitors can be eliminated.

Further, the above busbar configuration leads to presence of four busbars in which different currents flow through: a path between each switching element and the first DC capacitor 2a; a path between the switching element and the second DC capacitor 2b; a path between the switching element and the third DC capacitor 2c; and a path between the switching element and the fourth DC capacitor 2d. Consequently, the value of current flowing in each busbar is one fourth of the value in the conventional busbar configuration and, with the thickness dimension being kept unchanged from the conventional thickness dimension, heat generation from the busbar is less likely to occur, whereby the output current of the power conversion device can be increased. Meanwhile, if the same level of heat generation as that in the conventional busbar configuration can be performed, the thickness dimension of each busbar can be set to one fourth of the conventional thickness dimension. Thus, it is possible to solve the problems that machining work such as bending of the busbars becomes difficult, assembling work becomes difficult owing to increase in the weight of each single busbar, and other work becomes difficult.

In the case where the power conversion device is applied to the power conversion device intended for HVDCs shown in FIG. 10, the dimension in the Y direction of each cell converter 60 does not increase even if the number of the DC capacitors that are in parallel is increased. Thus, increase in the dimension in the Y direction of each cell converter housing 61 can be avoided. Meanwhile, even if a restriction is imposed on the dimension in the Y direction of the cell converter housing 61, the number of the cell converters 60 that can be accommodated in the cell converter housing 61 does not have to be decreased. Since the number of the cell converters 60 in each one of the valves is not decreased, no valves need to be additionally provided in the height direction so that the height of the valve tower 67 does not increase, either. Thus, the distance between the valve tower 67 and the ceiling portion of the valve hall 68 does not narrow, either. Therefore, even if the rated output current of a single cell converter 60 is increased, no problem arises in that the output of the entire power conversion device is decreased.

Moreover, the number of the DC capacitors can be increased also to five or more. The power conversion device according to the present disclosure is a power conversion device in which: a negative terminal of a first switching element and a positive terminal of a second switching element are connected to each other; and each of a plurality of DC capacitors is connected in parallel between a positive terminal of the first switching element and a negative terminal of the second switching element. The first switching element, the second switching element, and the plurality of DC capacitors are disposed in this order or the second switching element, the first switching element, and the plurality of DC capacitors are disposed in this order, such that all of positive terminals and negative terminals are aligned on a same side. Busbars connecting the switching elements and a DC capacitor other than the DC capacitor disposed farthest from the switching elements to each other, are provided with inductance adjustment portions for adjusting the lengths of the said busbars to adjust inductances. Consequently, the inductances on the busbars connecting the switching elements and the respective DC capacitors to each other can be set to be equal to one another, whereby variation in current among the DC capacitors can be eliminated. Further, with the thickness dimension being kept unchanged from the conventional thickness dimension, heat generation from the busbars is less likely to occur than in the conventional busbar configuration, and the output current of the power conversion device can be set to be higher than in the conventional busbar configuration. Meanwhile, if the same level of heat generation as that in the conventional busbar configuration can be performed, the dimension of each busbar can be set to be smaller than the conventional thickness. Thus, it is possible to solve the problems that machining work such as bending of the busbars becomes difficult, assembling work becomes difficult owing to increase in the weight of each single busbar, and other work becomes difficult.

Although various exemplary embodiments and examples are described in the present application, various features, aspects, and functions described in one or more embodiments are not inherent in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

DESCRIPTION OF THE REFERENCE CHARACTERS

1a first switching element
1b second switching element
2a first DC capacitor
2b second DC capacitor
2c third DC capacitor
2d fourth DC capacitor
3 cooler
10c midpoint busbar
11p first positive-side busbar
11n first negative-side busbar
12p second positive-side busbar (adjustment positive-side busbar)
12n second negative-side busbar (adjustment negative-side busbar)
13p third positive-side busbar (adjustment positive-side busbar)
13n third negative-side busbar (adjustment negative-side busbar)
14p fourth positive-side busbar (adjustment positive-side busbar)
14n fourth negative-side busbar (adjustment negative-side busbar)
32p, 32n, 33p, 33n, 34p, 34n inductance adjustment portion
40 insulating member
60 cell converter
61 cell converter housing
63 valve
67 valve tower

The invention claimed is:

1. A power conversion device comprising:
a first switching element and a second switching element each having a positive terminal and a negative terminal; and
a plurality of DC capacitors each having a positive terminal and a negative terminal,
the negative terminal of the first switching element and the positive terminal of the second switching element being connected to each other,
each of the plurality of DC capacitors being connected in parallel between the positive terminal of the first switching element and the negative terminal of the second switching element, wherein
the first switching element, the second switching element, and the plurality of DC capacitors are disposed in this order or the second switching element, the first switching element, and the plurality of DC capacitors are disposed in this order, such that all of the positive terminals and the negative terminals are aligned on a same side,
a plurality of positive-side busbars are provided, the number of the positive-side busbars being equal to the number of the DC capacitors, each positive-side busbar connecting the positive terminal of the first switching element and the positive terminal of a corresponding one of the plurality of DC capacitors to each other,
a plurality of negative-side busbars are provided, the number of the negative-side busbars being equal to the number of the DC capacitors, each negative-side busbar connecting the negative terminal of the second switching element and the negative terminal of a corresponding one of the plurality of DC capacitors to each other,
an adjustment positive-side busbar which is a positive-side busbar among the plurality of positive-side busbars other than the positive-side busbar connected to the DC capacitor farthest from the first switching element, has an inductance adjustment portion providing a bypass such that a length on the adjustment positive-side busbar between the positive terminal of the first switching element and the positive terminal of the DC capacitor to which the adjustment positive-side busbar is connected, is longer than a straight distance between the positive terminal of the first switching element and the positive terminal of the DC capacitor to which the adjustment positive-side busbar is connected, and
an adjustment negative-side busbar which is a negative-side busbar among the plurality of negative-side busbars other than the negative-side busbar connected to the DC capacitor farthest from the second switching element, has an inductance adjustment portion providing a bypass such that a length on the adjustment negative-side busbar between the negative terminal of the second switching element and the negative terminal of the DC capacitor to which the adjustment negative-side busbar is connected, is longer than a straight distance between the negative terminal of the second switching element and the negative terminal of the DC capacitor to which the adjustment negative-side busbar is connected.

2. The power conversion device according to claim 1, wherein each of the plurality of positive-side busbars and the plurality of negative-side busbars is formed of a sheet-shaped metal.

3. The power conversion device according to claim 2, wherein each positive-side busbar and the corresponding negative-side busbar that are connected to a same DC capacitor among the plurality of DC capacitors, are disposed in a superposed manner such that sheet surfaces of the positive-side busbar and the negative-side busbar face each other with an insulating member being interposed therebetween.

4. The power conversion device according to claim 3, wherein
the number of the plurality of DC capacitors is three, and
the positive-side busbar and the negative-side busbar that are disposed in a superposed manner and that are connected to the DC capacitor disposed at a farthest position from the first switching element, are interposed between
the adjustment positive-side busbar and the adjustment negative-side busbar that are disposed in a superposed manner and that are connected to another one of the DC capacitors, and
the adjustment positive-side busbar and the adjustment negative-side busbar that are disposed in a superposed manner and that are connected to still another one of the DC capacitors.

5. The power conversion device according to claim 3, wherein
the number of the plurality of DC capacitors is four or more, and
the positive-side busbar and the negative-side busbar that are disposed in a superposed manner and that are connected to the DC capacitor disposed at a farthest position from the first switching element, are disposed closer to the first switching element, the second switching element, and the plurality of DC capacitors than the adjustment positive-side busbars and the adjustment negative-side busbars that are disposed in a superposed manner and that are connected to the other DC capacitors.

6. The power conversion device according to claim 3, wherein the number of the plurality of DC capacitors is two.

7. The power conversion device according to claim 2, wherein the number of the plurality of DC capacitors is two.

8. The power conversion device according to claim 1, wherein the number of the plurality of DC capacitors is two.

9. A power conversion device wherein
the power conversion device according to claim 1, is configured as a cell converter,
a plurality of the cell converters are aligned in a horizontal direction and connected in cascade, to form valves, and
the valves are superposed in a vertical direction with an insulating structure being interposed therebetween, to form a valve tower.

* * * * *